(No Model.)
J. ZIMERMANN.
GEARING.
No. 504,645. Patented Sept. 5, 1893.
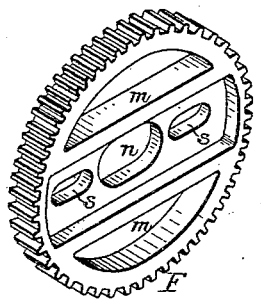
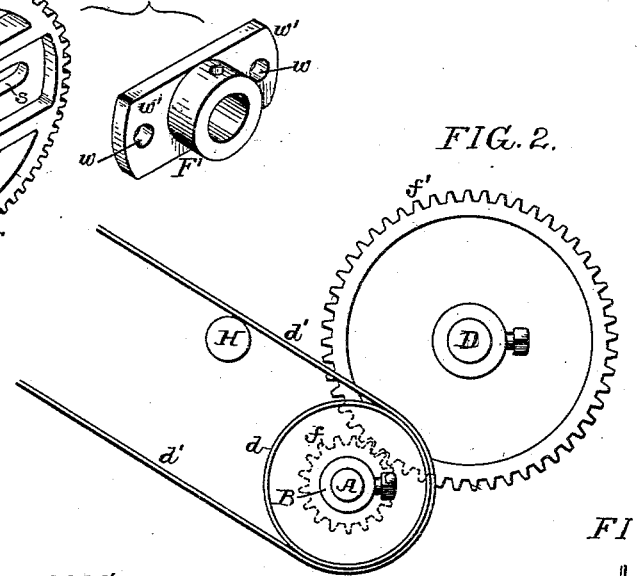
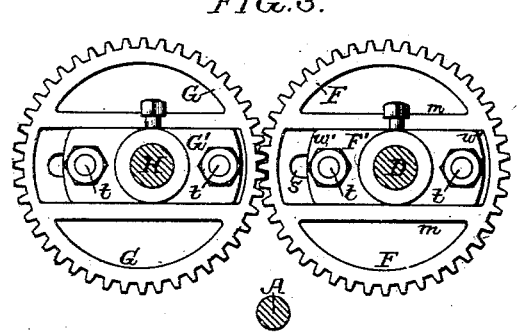
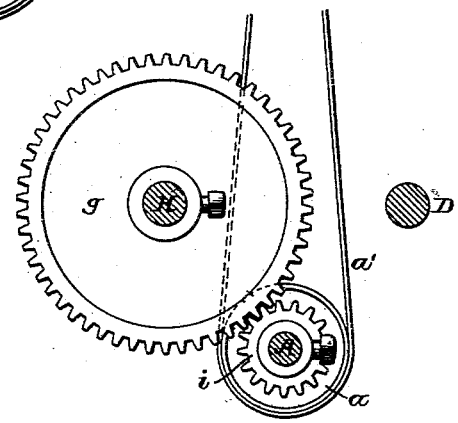
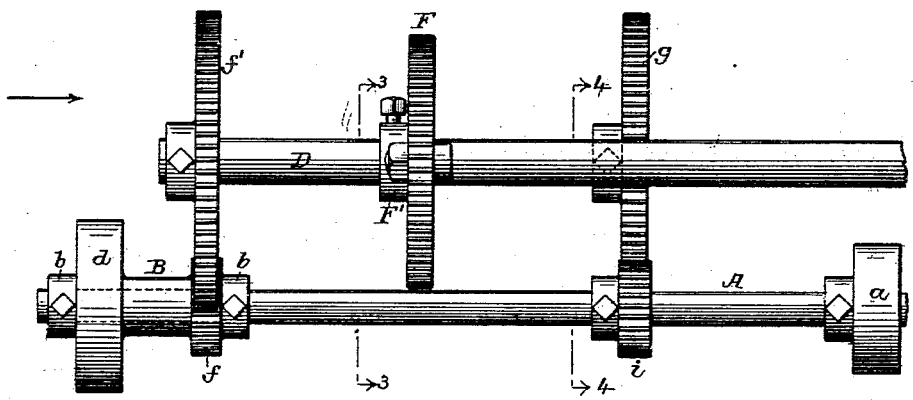
Witnesses:
R. Schleicher
F. D. Goodwin
Inventor:
John Zimermann
by his Attorneys
Howson & Howson

UNITED STATES PATENT OFFICE.

JOHN ZIMERMANN, OF PHILADELPHIA, PENNSYLVANIA, ASSIGNOR TO WILLIAM W. ALTEMUS AND JACOB K. ALTEMUS, OF SAME PLACE.

GEARING.

SPECIFICATION forming part of Letters Patent No. 504,645, dated September 5, 1893.

Application filed April 27, 1893. Serial No. 472,055. (No model.)

*To all whom it may concern:*

Be it known that I, JOHN ZIMERMANN, a citizen of the United States, residing in Philadelphia, Pennsylvania, have invented certain Improvements in Gearing for Transforming Uniform Rotary Motion into Differential Rotary Motion, of which the following is a specification.

The object of my invention is to provide simple and efficient gearing for transforming uniform rotary motion into differential rotary motion, the gearing being applicable to winding machines, spinning machines or machinery generally in which it is desirable that a shaft shall move faster at one time than at another, or faster at one part of each revolution than at another part of the same revolution.

In the accompanying drawings:—Figure 1, is a side view of gearing embodying my invention. Fig. 2, is an end view looking in the direction of the arrow, Fig. 1, but showing only the primary pair of gears, the others being omitted in order to avoid confusion. Fig. 3, is a transverse section on the line 3—3, Fig. 1, but showing only the second pair of gears. Fig. 4, is a transverse section on the line 4—4, Fig. 1, showing the final pair of gears; and Fig. 5, is a perspective view illustrating, detached from each other, the two parts of an adjustable eccentric gear wheel constituting part of the gearing.

In Fig. 1, A represents the shaft to which the differential rotary motion is to be imparted, this shaft having, in the present instance, a pulley $a$ from which power may be transmitted by a belt $a'$ to another shaft, or said shaft A may be furnished with a series of such pulleys $a$ so as to transmit the differential rotary motion to a number of independent shafts.

Turning loosely on the shaft A, but confined longitudinally thereto by collars $b$, is a tubular shaft B, which has a pulley $d$ for the reception of a driving belt $d'$ the latter serving to impart uniform rotating motion to said pulley $d$. The tubular shaft B is also provided with a spur pinion $f$, which meshes with a spur wheel $f'$, secured to a countershaft D, to which is also secured the hub of an adjustable eccentric spur wheel consisting of a toothed section F and a hub section F', the toothed section of this wheel engaging with the similar section G of another adjustable eccentric spur wheel having a hub section G', which is secured to a second countershaft H parallel with the shaft D, this second countershaft having a spur wheel $g$ which meshes with a spur pinion $i$ secured to the shaft A. It will thus be seen that uniform rotating motion is transmitted from the tubular shaft B to the countershaft D, and differential motion from the latter shaft to the countershaft H, this differential motion being in turn transmitted from the shaft H to the shaft A and the character of the differential motion being governed by the eccentricity of the wheels F and G. The toothed portion of either of the wheels F or G may be adjusted radially in respect to its shaft so as to vary the extent of its eccentricity as may be desired, the toothed portion of each wheel having a cross bar $m$ in which is an elongated opening $n$ for the passage of the shaft, and two elongated openings $s$ for the reception of the bolts $t$, whereby the toothed and hub portions of the wheel are secured together, said bolts passing through openings $w$ formed in laterally projecting wings $w'$ on the hub. By making both of the wheels F and G adjustable, the two wheels may always be maintained in proper relation to each other, whatever the extent of their eccentricity, without any movement of either of the shafts D or H from or toward each other. It will be noticed also that owing to the character of the gears $f f'$ the countershafts D and H rotate at a much lower speed than the driving shaft B, the gears $g$ and $i$, however, restoring the initial speed to the shaft A, so that the latter shaft may make a number of turns in changing from its lowest to its highest speed, or vice versa, as is necessary in many classes of machines in which differential motion is desired.

Where it is desired that there shall be differential motion in each rotation of the driven shaft, the shaft H may be the final shaft of the series. The shaft B may also be a solid shaft mounted independently of the shaft A if desired, although the construction shown is the preferable one because of its compactness. Belts or chain gears are to be regarded as the equivalents of the spur gears $f\,f'$ and $g$ and $i$.

Having thus described my invention, I claim and desire to secure by Letters Patent—

1. The combination of two shafts with a pair of adjustable eccentric spur wheels each comprising a hub portion secured to the shaft, a toothed portion adjustable radially on said hub portion, and means for securing the toothed and hub portions of the wheel together after adjustment, substantially as specified.

2. The combination of a uniformly rotated driving shaft, a pair of countershafts, gearing whereby one of said countershafts is uniformly driven from said driving shaft, and a pair of eccentric spur gears, one mounted upon each of said countershafts, and each adjustable in respect to its shaft so as to vary the extent of its eccentricity, substantially as specified.

3. The combination of a uniformly rotated driving shaft, a shaft to be differentially rotated, a pair of countershafts, gearing whereby one of said countershafts is uniformly rotated from the driving shaft, a pair of eccentric spur gears connecting said countershafts, and each adjustable so as to vary its eccentricity, and gearing whereby the second countershaft is connected to the shaft which is to be differentially driven, substantially as specified.

In testimony whereof I have signed my name to this specification in the presence of two subscribing witnesses.

JOHN ZIMERMANN.

Witnesses:
JOSEPH H. KLEIN,
HARRY SMITH.